Figure 1:
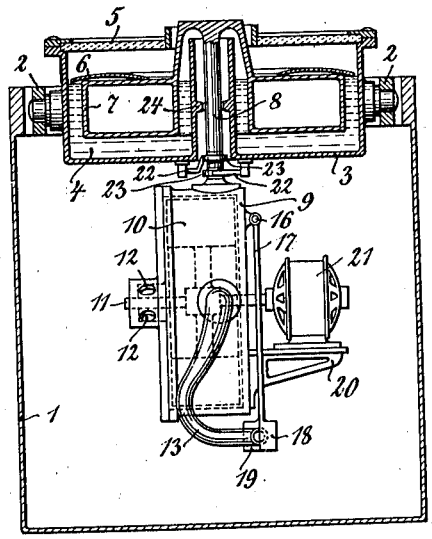

H. ANSCHÜTZ-KAEMPFE.
GYROSCOPE.
APPLICATION FILED JUNE 6, 1908.

1,019,582.

Patented Mar. 5, 1912.

Witnesses:
S. Newman
H. D. Penney

Inventor:
Hermann Anschütz-Kaempfe
By his Attorney,
F. H. Richards.

UNITED STATES PATENT OFFICE.

HERMANN ANSCHÜTZ-KAEMPFE, OF KIEL, GERMANY.

GYROSCOPE.

1,019,582.  Specification of Letters Patent. Patented Mar. 5, 1912.

Application filed June 6, 1908. Serial No. 437,075.

*To all whom it may concern:*

Be it known that I, HERMANN ANSCHÜTZ-KAEMPFE, Ph. D., a subject of the Empire of Germany, residing at Dammstrasse 20, Kiel, in the Kingdom of Prussia, Germany, have invented certain new and useful Improvements in Gyroscopes, of which the following is a specification.

This invention relates to a gyroscopic apparatus, the axis of rotation of which is entirely or partly secured in the horizontal plane whereby it makes oscillations about the north-south direction as the position of equilibrium. When such a gyroscopic apparatus is placed on a fixed support, the axis of gyration, under the damping influence of friction, after a certain time comes to rest in the north-south direction. But the behavior of the apparatus on a movable support, such for instance as a ship, is different. In this case, the friction acts as an impulse for oscillations. Moreover, the acceleration pressures such as are produced when the ship changes its speed, bring about oscillations. For these reasons, a gyroscopic compass which generally has a large mass, will never come to rest and, therefore be useless for ships, if it is not provided with a damping device which is independent of certain of the movements of the ship upon which it is mounted. According to this invention a damping of the oscillations of such a gyroscopic apparatus in the north-south direction is brought about in such manner that, on the oscillations taking place, certain external counter-action forces which exercise a damping influence on the said oscillations are caused to act. This is effected with the assistance of the angular twisting or angle of turning which takes place between the spindle of rotation and the horizontal plane when the axis of rotation swings out of the north-south position. The size and the direction of the angle of turning depend on the speed of oscillation. The gyroscopic apparatus is provided with a pendulum which in the normal position of the apparatus forms a given angle with the axis of rotation. Then the change of angle produced by the oscillations, can be utilized in some way for releasing and regulating damping forces.

By the expression pendulum is meant any device which, under the influence of gravity, occupies a given definite position relatively to the surface of the earth, that is to say, not only a pendulum proper, but also balance beams, levels, Cardan suspensions and the like.

A construction of gyroscopic apparatus according to this invention is illustrated by way of example in the accompanying drawing. In this construction the external counter-action force which is caused to act on the oscillations taking place, and exercises a damping influence on the said oscillations, is constituted by the reaction of air jets. The apparatus is made in the form of a centrifugal air pump, in such manner that it draws in air and discharges it through nozzles. The value of the reaction moment produced is regulated by means of slide valves which are shifted by the relative turning of the axis of rotation and the pendulum, which takes place when oscillations take place, and throttles the air jets to a greater or less extent.

Figure 2:
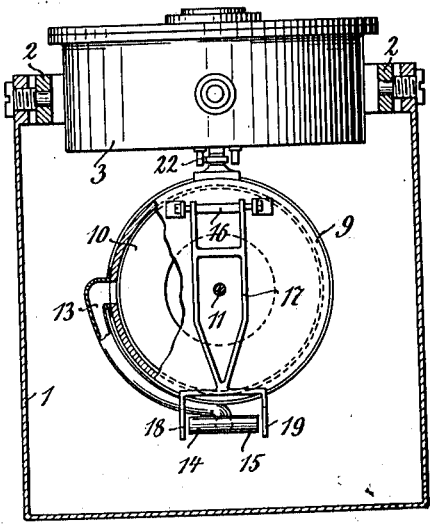
Figure 3:
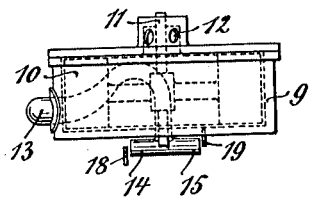

Figure 1 shows the apparatus in side elevation and the suspension device in section. Fig. 2 is a front elevation, partly in section, of the gyroscopic apparatus, while the suspension device is shown partly in section and partly in elevation. Fig. 3 is a plan of the gyroscopic apparatus with the regulating slides, after the removal of the motor.

In a frame 1 which, for instance can be that of an ordinary ship's compass, is mounted, in the ring 2 suspended by means of a Cardan joint, a container or vessel 3 filled with some suitable liquid 4 and covered by means of a glass plate 5. The compass card 6 can be seen through the glass plate, and is secured to a float 7, which floats in the liquid. The float 7 is rigidly secured, by means of an intermediate part 8, to a casing 9 in which the rotating mass 10 of the gyroscopic apparatus is suitably supported by means of the spindle of rotation 11. The casing 9 is completely closed except for openings 12 and a pipe 13 connected to the lateral wall of the casing and divided at the bottom into two nozzles 14 and 15 (Fig. 2) directed transversely of the axis of rotation. When the rotary mass of the gyroscopic apparatus is rotated air is drawn in through the openings 12 and expelled through the pipe 13 and the nozzles 14 and 15. To the lateral wall of the casing is further secured a pendulum 17 swinging about a spindle 16 and provided at its lower end with the two plates 18 and 19. These plates, in the neutral non-counteractive position of rest to the apparatus, hang in front of the openings of the nozzles 14 and 15 in such manner that they partly close them, the plate 18 closing the nozzle 14, and the plate 19 the nozzle 15. Finally, to the gyroscopic apparatus casing is also secured a bracket 20 on which is mounted an electric motor 21 connected to the spindle of rotation 11 of the gyroscopic apparatus. The electric motor is supplied with current from the outside by means of brushes 22 which slide on the contact rings 23 of the intermediate part or shaft 8. A collar bearing or guide 24 keeps the float 7 centrally in the vessel 3 without, however, interfering with the lateral oscillations of the gyroscopic apparatus with the float.

The gyroscopic apparatus is suspended from the float 7 in such manner that its spindle of rotation 11 has its equilibrium position in the horizontal plane when the gyroscopic apparatus is stationary. The gyroscopic apparatus is then secured by gravity in the horizontal plane, for the center of the upward pressure of the liquid is situated above the center of gravity of the system.

When the gyratory apparatus is rotated, its spindle, as already stated, will oscillate about the north-south direction as position of equilibrium. In that case the axis of rotation will experience an elevation in proportion to the speed of oscillation, that is to say it will be moved to a greater or smaller angle of inclination relatively to the horizontal plane. The pendulum 17 which, owing to the action of gravity, remains in the vertical position, will move through exactly the same angle relatively to the direction of the axis of rotation, that is to say, the pendulum will give the extent and the direction of the elevation.

The air jets expelled from the nozzles 14 and 15 during the rotation of the gyroscopic apparatus, produce reaction moments which have the tendency to turn the gyroscopic apparatus casing 9 and, therefore the spindle of rotation 11, about the vertical axis. In the normal position, these two reaction moments neutralize each other, as the arrangement is made in such manner that the moments are equal to each other at both nozzles. When however the casing 9, together with the spindle of rotation, oscillates in the vertical direction relatively to the pendulum 17, which remains in the vertical position, as already described, the plates 18 and 19 will be moved relatively to the nozzles 14 and 15, and the air jet will be throttled in one nozzle to a greater, and in the other to a smaller extent than before. In that way the reaction moments will become unequal, and the stronger moment will have the tendency to turn the gyroscopic apparatus about its vertical axis. If the plates or valves are arranged in a correct manner, it will be possible in that way to cause the reaction moments of the discharged air jets to act always in opposition to the direction of oscillation at the moment and in proportion to the speed of oscillation, whereby the oscillations of the gyroscopic apparatus about the north-south direction will be damped.

It is not necessary to measure on the gyroscopic apparatus itself the angle of inclination of the axis of rotation, which brings about the adjustment in the north-south direction, on the contrary a small auxiliary gyroscopic apparatus could be made for that purpose connected to the main gyroscopic apparatus in such manner that the speed and direction of oscillation about the vertical must be always the same in both apparatus.

What I claim as my invention and desire to secure by Letters Patent is:

1. In a gyroscope apparatus, the combination of a rotatable body, a spindle for said body, supporting means for carrying the said spindle in approximately a horizontal plane, a pendulum device connected to said supporting means, damping means carried in part by the supporting means and in part by the pendulum device and connected and operative to be non-counteractive to the said apparatus when the spindle is horizontal and to exert a counter-action force to the said apparatus when the spindle is shifted from the horizontal plane, thereby to effect a turning movement of the apparatus to dampen its oscillation.

2. In a gyroscope apparatus, the combination of a rotatable body, a spindle for said body, supporting means for carrying the said spindle in approximately a horizontal plane, a pendulum device connected to said supporting means, the pendulum being supported to swing on a horizontal axis and in a plane coinciding with the axis of said spindle, damping means carried in part by the supporting means and in part by the pendulum device and connected and operative to be non-counteractive to the said apparatus when the spindle is horizontal and to exert a counter-action force to the said apparatus when the spindle is shifted from the horizontal plane, thereby to effect a turning movement of the apparatus to dampen its oscillation.

3. In a gyroscopic apparatus, the combination with a rotatable body, of a spindle for said body, a support for supporting the said spindle in approximately a horizontal plane, a pendulum connected to said support, vanes on the pendulum, means for supplying fluid under pressure, jets carried by the support and constructed and arranged to direct said fluid in opposite directions in balanced relationship thereto against the said vanes when the gyroscope spindle is horizontal and in unbalanced relationship to said jets when the said spindle is moved from the horizontal thereby causing the said pendulum to throttle one or the other of the said fluid jets for exerting a turning movement on the apparatus for damping the oscillation of the said apparatus.

4. In a gyroscopic apparatus, the combination with a rotatable body, of a spindle for said body, a support for supporting the said spindle in approximately a horizontal plane, a pendulum connected to said support, vanes on the pendulum, air current supplying means carried by the support, directing means for directing the air in balanced relationship thereto against the said vanes when the rotating gyroscope spindle is horizontal and in unbalanced relationship to said air directing means when the said spindle is moved from the horizontal for exerting a turning moment on the apparatus for damping oscillations of the said apparatus.

5. In a gyroscopic apparatus the combination with a rotatable body, of a spindle for said body, a casing for supporting the said spindle and inclosing the rotatable body, said casing having openings for the escape of air currents created by the rotation of said rotatable body, means for maintaining the casing in such a position that the spindle will normally be in approximately a horizontal plane, a pendulum connected to the casing, vanes on the pendulum constructed and located to be opposite the respective holes in the casing and in relatively balanced relationship thereto when the said spindle is horizontal and in unbalanced relationship when the spindle is moved from the horizontal for exerting a turning moment on the apparatus by the unbalanced escape of the air for damping the oscillations of the said apparatus.

6. In a gyroscope apparatus, the combination with a rotatable mass, of a spindle for said mass, a closed casing for said mass, means for rotating said mass, said casing being provided with intake and outlet openings, means associated with the said outlet opening for exercising reaction moments on the gyroscope apparatus whereby the said moments are equal and opposite to each other when the spindle is horizontal and unequal and opposite when the spindle is slightly displaced from the horizontal.

7. In a gyroscopic apparatus the combination with a rotatable mass, of a spindle for said mass, a casing inclosing said mass and supporting said spindle, means operative upon the casing for normally confining the axis of said spindle in approximately a horizontal plane, nozzles on the said casing for the escape of air, a pendulum on the said casing, plates on the pendulum located and arranged to control the extent of opening of the respective nozzles variably with the variations of the oscillations of the gyroscopic apparatus about one of its axes whereby such oscillation is neutralized by the reaction of the air issuing from the nozzles.

8. In a gyroscopic apparatus embodying a rotatable mass and means for normally maintaining the axis of rotation of such mass in a horizontal plane, the combination with nozzles connected with said rotatable mass and disposed upon opposite sides of a vertical plane embracing the said axis of rotation, and directed in opposite directions transversely to said vertical plane, of a valve for each nozzle, and means actuated by the movement of the said axis in angular relation to the horizontal plane for controlling the valves.

9. In a gyroscopic apparatus, the combination with a rotatable body having a normally horizontal axis of rotation, of a casing for the same provided with an air inlet and with a pair of oppositely directed air discharge nozzles located respectively at opposite sides of a plane embracing the normally vertical axis of the gyroscope and the axis of the rotatable body, valves for the nozzles, and means controlled by the movement of the spindle of the body of the gyroscope out of the horizontal plane for controlling the valves.

10. In a gyroscopic apparatus embodying a rotatable mass and means for normally maintaining the axis of rotation of such mass in a horizontal plane, the combination with a casing for said rotatable mass, of a pair of nozzles carried by said casing and disposed upon opposite sides of a vertical plane embracing the said axis of rotation, and directed in opposite directions transversely to said vertical plane, a valve for each nozzle, and means carying said valves and connected to the casing and constructed and adapted to maintain a vertical position irrespective of the movement of the said axis in angular relation to the horizontal for controlling the valve and opening one and closing the other upon movement away from the horizontal in one direction and upon movement away from the horizontal in the opposite direction reversing the order of opening and closing.

In witness whereof I have hereunto signed my name this 18th day of May, 1908 in the presence of two subscribing witnesses.

HERMANN ANSCHÜTZ-KAEMPFE.

Witnesses:
  JULIUS RÖPKE,
  OTTO LAU.